US006413906B1

(12) United States Patent
Shimatani et al.

(10) Patent No.: US 6,413,906 B1
(45) Date of Patent: Jul. 2, 2002

(54) LI$_2$O-AL$_2$O$_3$-SIO$_2$ CRYSTALLIZED GLASS AND CRYSTALLIZABLE GLASS THEREFOR

(75) Inventors: Narutoshi Shimatani, Uji; Hiroyuki Yamada, Kusatsu; Akihiko Sakamoto, Shiga, all of (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 130 days.

(21) Appl. No.: 09/626,746

(22) Filed: Jul. 27, 2000

(30) Foreign Application Priority Data

Aug. 2, 1999 (JP) ............................. 11-219175

(51) Int. Cl.$^7$ .................... C03C 10/12; C03C 10/14
(52) U.S. Cl. .............................. 504/4; 501/7
(58) Field of Search ........................... 501/4, 7

(56) References Cited

U.S. PATENT DOCUMENTS

| | | | |
|---|---|---|---|
| 3,756,798 A | | 9/1973 | Ernsberger |
| 4,455,160 A | | 6/1984 | Rittler |
| 5,212,122 A | * | 5/1993 | Pannhorst et al. ............ 501/69 |
| 5,446,008 A | * | 8/1995 | Krolla et al. ................. 501/68 |
| 5,785,726 A | | 7/1998 | Dorfeld et al. |

FOREIGN PATENT DOCUMENTS

| | | |
|---|---|---|
| DE | 43 21 373 | 1/1995 |
| JP | 39-21049 | * 9/1939 |
| JP | 40-20182 | * 9/1940 |
| JP | 01 308845 | 12/1989 |
| JP | 3120422 | * 12/2000 |

OTHER PUBLICATIONS

Database WPI, Section Ch, Week 1990005, Derwent Publications Ltd., London, GB; An 1990-032439, Abstract of JP 1-308845, Dec. 1989.

Kever E. De et al: "Influence of Batch Moisture and Atmosphere on the Melting Behavior of AS203- and SB203-containing Glasses", Glastechnische Berichte, De, Verlag Der Deutschen Glastechnischen Gesellschaft, Frankfurt, vol. 65, No. 2, Feb. 1, 1992, pp. 64-66.

* cited by examiner

*Primary Examiner*—Karl Group
(74) *Attorney, Agent, or Firm*—Collard & Roe, P.C.

(57) ABSTRACT

Li$_2$O—Al$_2$O$_3$—SiO$_2$ crystallized glass is provided which has clarity and glass characteristics equivalent to or superior to a conventional crystallized glass, even when the content of As$_2$O$_3$ is decreased. The Li$_2$O—Al$_2$O$_3$—SiO$_2$ crystallized glass contains, by weight, 0.05 to 4% Sb$_2$O$_3$, in which the content of β-OH is 0.3 to 4/mm.

4 Claims, No Drawings

Li$_2$O-Al$_2$O$_3$-SiO$_2$ CRYSTALLIZED GLASS
AND CRYSTALLIZABLE GLASS THEREFOR

BACKGROUND OF THE INVENTION

1. Field of the Invention

The present invention relates to Li$_2$O—Al$_2$O$_3$—SiO$_2$ crystallized glass and Li$_2$O—Al$_2$O$_3$—SiO$_2$ crystallizable glass therefor.

2. Description of the Related Art

Conventionally, Li$_2$O—Al$_2$O$_3$—SiO$_2$ crystallized glass has been used for front glass panels in kerosene heaters, wood stoves and the like, substrates for high-technology products, such as color filters, image sensors and the like, setters for baking electronic devices, shelf boards for microwave ovens, top plates for electromagnetic cooking devices, window glass for fire doors, and the like. For example, Japanese Examined Patent Publication(JP-B) No. S39-21,049, Japanese Examined Patent Publication (JP-B) No. S40-20,182, and Japanese Unexamined Patent Publication (JP-A) No. H01-308,845 disclose Li$_2$O—Al$_2$O$_3$—SiO$_2$ crystallized glass having a β-quartz solid solution represented by the formula Li$_2$O—Al$_2$O$_3$.nSiO$_2$, in which n≧2, or a β-spodumene solid solution represented by the formula Li$_2$O—Al$_2$O$_3$.nSiO$_2$, in which n≧4, both of which are produced in the crystallized glass as a main crystal.

The Li$_2$O—Al$_2$O$_3$—SiO$_2$ crystallized glass mentioned above has high mechanical strength and superior thermal characteristics, such as a low coefficient of thermal expansion. In addition, since the crystal produced in the Li$_2$—O—Al$_2$O$_3$—SiO$_2$ crystallized glass is alterable by changing heating conditions in a crystallization process, transparent crystallized glass (a β-quartz solid solution is produced) and white and opaque crystallized glass (a β-spodumene solid solution is produced) can be produced from the same composition of raw glass material. Consequently, in accordance with the application, Li$_2$O—Al$_2$O$_3$—SiO$_2$ crystallized glass suitable for the application can be selectively produced.

When this kind of crystallized glass is produced, heating to a high temperature above 1,400° C. for melting raw glass materials is required. Accordingly, as a fining agent added to one batch for glass production, arsenic oxide (As$_2$O$_3$) is used which is capable of evolving a great deal of gas for fining during melting at a high temperature. In melting in a batch production system, As$_2$O$_3$ contained in raw glass materials is oxidized at 400 to 500° C. so as to form As$_2$O$_5$, and the As$_2$O$_5$ is again reduced at 1,200 to 1,800° C. to form As$_2$O$_3$, whereby oxygen gas is evolved. The oxygen gas thus evolved diffuses into bubbles in the glass, and the bubbles enlarge, facilitating rising thereof, whereby the bubbles are removed. Since As$_2$O$_3$ has the fining effect described above, As$_2$O$_3$ has been widely used as a fining agent. In particular, As$_2$O$_3$ is a very effective fining agent for Li$_2$O—Al$_2$O$_3$—SiO$_2$ crystallized glass that must be subjected to melting at a high temperature.

In addition to the fining effect, As$_2$O$_3$ has an effect of promoting crystallization. Accordingly, it is understood that AS$_2$O$_3$ is an essential component in order to obtain desired characteristics of the crystallized glass described above.

However, As$_2$O$_3$ is high toxic, and hence, environmental pollution may occur during a manufacturing process for glass, disposal of waste glass, and the like. Accordingly, it is desirable to reduce the, amount of As$_2$O$_3$ used. However, when the amount of As$_2$O$_3$ is simply decreased, the effects on fining and crystallization are degraded, and as a result, clarity and glass characteristics, which are equivalent to those obtained if the amount of As$_2$O$_3$ were not decreased, cannot be obtained.

SUMMARY OF THE INVENTION

Accordingly, it is an object of the present invention to provide Li$_2$O—Al$_2$O$_3$—SiO$_2$ crystallized glass having clarity and glass characteristics equivalent to or superior to those of a conventional crystallized glass, even when the amount of As$_2$O$_3$ used is decreased, and to provide Li$_2$O—Al$_2$O$_3$—SiO$_2$ crystallizable glass as a raw glass material therefor.

According to one aspect of the present invention, there is provided a Li$_2$O—Al$_2$O$_3$—SiO$_2$ crystallized glass which contains, by weight, 0.05 to 4% Sb$_2$O$_3$, in which the content of β-OH is 0.3 to 4/mm.

According to another aspect of the present invention, there is provided a Li$_2$O—Al$_2$O$_3$—SiO$_2$ crystallizable glass which contains, by weight, 0.05 to 4% Sb$_2$O$_3$, in which the content of β-OH is 0.15 to 2/mm.

DESCRIPTION OF THE PREFERRED EMBODIMENT

Description will first be made in detail as regards a Li$_2$O—Al$_2$O$_3$—SiO$_2$ crystallizable glass and a Li$_2$O—Al$_2$O$_3$—SiO$_2$ crystallized glass according to the present invention.

The Li$_2$O—Al$_2$O$_3$—SiO$_2$ crystallized glass of t he present invention has a β-quartz solid solution or a β-spodumene solid solution produced as a main crystal therein. By the production of the crystal Mentioned above, the Li$_2$O—Al$_2$O$_3$—SiO$_2$ crystallized glass is obtained, which has a low coefficient of thermal expansion of approximately −10 to 30×10$^{-7}$/° C. (30 to 750° C.) and high mechanical strength. When a metastable β-quartz solid solution is produced as a main crystal, transparent crystallized glass is obtained, and when a metastable β-quartz solid solution is inverted to a stable β-spodumene solid solution by heating at a high temperature, white and opaque crystallized glass is obtained.

Instead of As$_2$O$_3$, antimony oxide (Sb$_2$O$_3$) is used in the crystallized glass of the present invention. Sb$_2$O$_3$ is oxidized to Sb$_2$O$_5$ at approximately 400° C. under melting conditions, and in a high temperature range of 1000° C. or more, a great deal of oxygen gas is evolved by a reaction caused by a change in valence of the antimony (Sb) ion. The gas evolved diffuses into bubbles remaining in the glass and increases the diameters of the bubbles, so that the bubbles rise and escape, resulting in the fining of the glass. In addition, it was understood through the research by the inventors of the present invention that Sb$_2$O$_3$ functions to promote crystallization in the glass just as As$_2$O$_3$ does.

However, the effects of Sb$_2$O$_3$ on fining and promotion of crystallinity are smaller than those of As$_2$O$_3$. When the content of Sb$_2$O$_3$ is increased, the effects described above are enhanced; however, since Sb$_2$O$_3$ facilitates coloration of glass due to impurities (in the present invention, coloration caused by impurity Fe$_2$O$_3$ in the presence of TiO$_2$) more strongly than As$_2$O$_3$, Sb$_2$O$_3$ cannot be added to the glass in an amount sufficient to obtain the effects of Sb$_2$O$_3$ on fining and promotion of crystallinity. Through the intensive research by the present inventors of the present invention, it was discovered that clarity and crystallinity of glass can be improved when the content of water in the glass is increased. In this connection, even though the promotion of crystallinity of glass can be achieved by increasing the content of MgO, ZnO, Na$_2$O, K$_2$O, and the like, MgO and ZnO promote coloration due to impurities, and coefficient of thermal expansion is significantly increased when $Na_2O$ or $K_2O$ is added. Accordingly, the components mentioned above cannot be added to glass in an amount sufficient to promote crystallinity. In contrast, water can improve clarity and crystallinity of glass without promoting coloration due to impurities and increasing coefficient of thermal expansion.

In the present invention, the content of water in glass is represented by the content of β-OH.

The content of β-OH in $Li_2O$—$Al_2O_3$—$SiO_2$ crystallized glass of the present invention is calculated by the following equation based on the data obtained in an infrared absorption spectrum; the content of β-OH $(/mm) = \{\log(T_{3850}/T_{3500})\}/t$, in which $T_{3850}$ is the transmittance in the vicinity of 3,850 $cm^{-1}$, $T_{3500}$ is the minimum transmittance in the vicinity of 3,500 $cm^{-1}$, and t is the thickness of the crystallized glass used for spectrum measurement (mm, actual measured value 3 mm).

In addition, the content of β-OH in $Li_2O$—$Al_2O_3$—$SiO_2$ crystallizable glass of the present invention for producing the crystallized glass described above is calculated by the following equation based on the data obtained in a infrared absorption spectrum; the content of β-OH $(/mm) = \{\log(T_{3850}/T_{3570})\}/t$, in which $T_{3850}$ is the transmittance in the vicinity of 3,850 $cm^{-1}$, $T_{3570}$ is the minimum transmittance in the vicinity of 3,570 $cm^{-1}$, and t is the thickness of the crystallizable glass used for spectrum measurement (mm, actual measured value 3 mm).

In the case in which $As_2O_3$ is replaced with $Sb_2O_3$, when the amount of water, in which a satisfactory crystallinity can be obtained, is represented by β-OH in accordance with the equations described above, the content in the crystallized glass is 0.3 to 4/mm, and preferably, 0.3 to 2/mm, and the content in the crystallizable glass is 0.15 to 2/mm, and preferably 0.15 to 1/mm. When the content of β-OH in the crystallized glass is less than 0.3/mm, and the content of β-OH in the crystallizable glass is less than 0.15/mm, the clarity of the glass is deteriorated. In addition, since the crystallinity of the crystallized glass is low, white turbidity occurs in the transparent crystallized glass, and sufficient whiteness in the white crystallized glass cannot be obtained. In contrast, when the content of β-OH in the crystallized glass is more than 4/mm, and the content of β-OH in the crystallizable glass is more than 2/mm, since the crystallinity of the crystallized glass is significantly high, a state of a metastable β-quartz solid solution cannot be maintained, and as a result, transparent crystallized glass is difficult to obtain. In addition, in the case of white crystallized glass, it is not preferable since the crystallization thereof occurs in excess, so that the brilliance at the surface of the crystallized glass is reduced. The reason for the difference in the contents of β-OH in the crystallized glass and crystallizable glass is that, when β-OHs of crystallized glass and crystallizable glass are measured in which the compositions and water contents are equal to each other, the β-OH of the crystallized glass is approximately 1.3 to 2 times that of the crystallizable glass due to the difference in infrared absorption characteristics therebetween.

The preferable composition of the crystallized glass of the present invention is, by weight, 50 to 80% $SiO_2$, 12 to 30% $Al_2O_3$, 1 to 6% $Li_2O$, 0 to 5% MgO, 0 to 5% ZnO, 0 to 8% BaO, 0 to 5% $Na_2O$, 0 to 5% $K_2O$, 0 to 8% $TiO_2$, 0 to 7% $ZrO_2$, 0 to 7% $P_2O_5$, and 0.05 to 4% $Sb_2O_3$.

The reasons for the limitations on the composition in the present invention will be described.

The content of $SiO_2$ is a constituent for forming the crystal and the glass network former, and is 50 to 80%, preferably, 60 to 75%, and more preferably 60 to 71%. When the content of $SiO_2$ is less than 50%, the coefficient of thermal expansion is increased considerably. On the other hand, when the content thereof is more than 80%, the glass is difficult to melt.

The content of $Al_2O_3$ is a constituent for forming the crystal and the glass network former, and is 12 to 30%, preferably 17 to 27%, and more preferably, 17 to 24%. When the content of $Al_2O_3$ is less than 12%, the chemical resistance is deteriorated, and the glass is likely to devitrify. On the other hand, when the content thereof is more than 30%, the glass is difficult to melt due to a significant increase in viscosity thereof.

$Li_2O$ is a component for forming the crystal and has a function of decreasing the viscosity thereof in addition to a significant influence on the crystallinity of the glass. The content of $Li_2O$ is 1 to 6%, preferably 3 to 5%, and more preferably, 3.2 to 4.8%. When the content of $Li_2O$ is less than 1%, the crystallinity of the glass is low, and the coefficient of thermal expansion is increased considerably. In addition, when the glass is transparent crystallized glass, white turbidity is likely to occur. When the glass is white crystallized glass, the whiteness thereof tends to fall. On the other hand, when the content of $Li_2O$ is more than 6%, the glass is likely to devitrify due to significantly high crystallinity. Therefore, a metastable β-quartz solid solution is difficult to obtain so that white turbidity occurs and transparent crystallized glass is difficult obtain.

The content of MgO and the content of ZnO are respectively 0 to 5%, preferably 0 to 3%, and more preferably, 0 to 2.5%. When the contents of MgO and ZnO are each more than 5%, the crystallinity is high, and coloration due to impurities is intense due to an increase in the amount of crystal produced.

The total content of MgO and ZnO is 0 to 7%, and preferably, 0 to 5%. When the total content of MgO and ZnO is more than 7%, coloration due to impurities tends to be intense.

The content of BaO is 0 to 8%, preferably 0.3 to 5%, and more preferably, 0.5 to 4%. When the content of BaO is more than 8%, a sufficient amount of crystal is difficult to obtain since production of the crystal is inhibited, and hence, the coefficient of thermal expansion is significantly increased. In addition, in the case of forming transparent crystallized glass, white turbidity in the crystal is likely to occur. BaO is not an essential component; however, BaO is preferably contained by the following reasons described below. That is, even though the effects of BaO on fining and promotion of crystallization are smaller than those of $As_2O_3$, it was discovered through the intensive research by the present inventors that BaO functions to enhance the fining effect of $Sb_2O_3$, and when BaO is used with $Sb_2O_3$, oxygen gas evolved from $Sb_2O_3$ effectively clarify the glass, and hence, an effect thereof on fining equivalent to that of $As_2O_3$ can be obtained. The reasons BaO has the effect mentioned above are believed to be that (1) the time for fining is shortened by facilitating dissolving of undissolved raw materials, and (2) bubbles quickly increase in size by lowering the viscosity of a molten solution of the glass and by increasing the diffusion velocity of the gas to promote fining. Furthermore, it was also discovered that BaO has a function of improving crystallinity due to a decrease in viscosity in addition to the function of enhancing the effect of $Sb_2O_3$ on fining. Accordingly, it is preferable that BaO be contained as an essential component.

The content of $Na_2O$ and the content of $K_2$, are respectively 0 to 5%, preferably 0 to 3%, and more preferably, 0 to 2%. When the contents of $Na_2O$ and $K_2O$ are each more than 5%, a sufficient amount of the crystal cannot be obtained due to a decrease in crystallinity, and the coefficient of thermal expansion is increased significantly. Furthermore, when transparent crystallized glass is produced, white turbidity in the crystal is likely to occur.

The total content of $Na_2O$ and $K_2O$ is 0 to 7%, and preferably, 0 to 4%. When the total content of $Na_2O$ and $K_2O$ is more than 7%, the coefficient of thermal expansion is likely to increase, and white turbidity in the crystal is readily to occur when transparent crystallized glass is produced.

The content of $TiO_2$ as a nucleation agent is 0 to 8%, preferably 0 to 4%, and more preferably, 0 to 3%. When the content of $TiO_2$ is more than 8%, the coloration due to impurities is intense.

The content of $ZrO_2$ as a nucleation agent is 0 to 7%, preferably 1 to 4%, and more preferably, 1 to 3%. When the content of $ZrO_2$ is more than 7%, the glass is significantly devitrified in addition to it being difficult to melt the glass.

The content of $P_2O_5$ is a component for improving the crystallinity of glass, and is 0 to 7%, preferably 0 to 4%, and more preferably, 0 to 3%. When the content of $P_2O_5$ is more than 7%, the coefficient of thermal expansion is significantly increased, and white turbidity in the crystal is likely to occur when transparent crystallized glass is produced.

The content of $Sb_2O_3$ is 0.05 to 4%, preferably 0.05 to 2%, and more preferably, 0.1 to 1.5%. When the content of $Sb_2O_3$ is less than 0.05%, the effects on fining and promotion of crystallization cannot be obtained, and when the content is more than 4%, the coloration due to impurities is considerable.

In the crystallized glass of the present invention, BaO and $Sb_2O_3$, which have significant influence on clarity and crystallinity, are preferably adjusted so as to have the ratio of $BaO/Sb_2O_3$ from 0.2 to 15 on a percent by weight basis, and more preferably, from 0.3 to 13. When the ratio of $BaO/Sb_2O_3$ is less than 0.2, satisfactory effects on fining and promotion of crystallization are difficult to obtain. On the other hand, when the ratio of $BaO/Sb_2O_3$ is more than 13, a sufficient amount of crystal cannot be obtained due to a decrease in crystallinity, and as a result, desired characteristics of the glass are difficult to obtain.

Similarly to the above, the water and $Sb_2O_3$, which have significant influence on crystallinity, are preferably adjusted so as to have the ratio of β-OH (/mm)/$Sb_2O_3$ (percent by weight) from 0.05 to 10, and more preferably, 0.10 to 8. When the ratio is less than 0.05, the crystallinity is decreased, white turbidity is likely to occur in transparent crystallized glass, and the whiteness of white crystallized glass is difficult to obtain. On the other hand, when the ratio is more than 10, a state of a metastable β-quartz solid solution is difficult to maintain due to significantly high crystallinity, and as a result, transparent crystallized glass is difficult to obtain. In addition, devitrification in the glass occurs, and as a result, the brilliance at the surface of the crystallized glass may be reduced.

Furthermore, various components other than those described above may be added to the crystallized glass of the present invention.

For example, in order to enhance the effects on fining and promotion of crystallization, $SnO_2$ may be added in an amount of up to 2%, preferably up to 0.8%, and more preferably, up to 0.6%. $SnO_2$ acts as a fining agent by evolving oxygen at a higher temperature than $Sb_2O_3$. In addition, since $SnO_2$ forms $ZrO_2$—$TiO_2$—$SnO_2$ crystal nuclei together with $TiO_2$ and $ZrO_2$, $SnO_2$ also acts as a nucleation agent. However, $SnO_2$ is more likely to cause coloration due to impurities than $Sb_2O_3$ and $As_2O_3$, it is not preferable that $SnO_2$ be added in an amount exceeding the content mentioned above. In addition, chlorine in an amount of up to 2%, and preferably, up to 1%, may be added to glass. However, it is not preferable since the chemical resistance of the glass is deteriorated when the amount of the chlorine exceeds the content mentioned above. Fining agent other than those mentioned above may be added to glass; however, the contents thereof must be limited to ranges in which the fining agents do not adversely affect the characteristics of glass. In this connection, in order to complement the effects on fining and promotion of crystallinity, $As_2O_3$ may be added in an amount of up to approximately 0.8%. However, the amount of $As_2O_3$ added should be as small as possible, and it is recommendable not to use $As_2O_3$, if possible.

Furthermore, as a coloring agent, for example, $Fe_2O_3$ may be added in an amount of up to 0.5%, preferably up to 0.1%, and more preferably, up to 0.08%.

The $Li_2O$—$Al_2O_3$—$SiO_2$ crystallized glass of the present invention having the composition described above can be produced by a manufacturing method described below.

Raw material having the composition described below on a percent by weight basis is prepared: 50 to 80% $SiO_2$, 12 to 30%/o $Al_2O_3$, 1 to 6% $Li_2O$, 0 to 5% MgO, 0 to 5% ZnO, 0 to 8% BaO, 0 to 5% $Na_2O$, 0 to 5% $K_2O$, 0 to 8% $TiO_2$, 0 to 7% $ZrO_2$, 0 to 7% $P_2O_5$, and 0.05 to 4% $Sb_2O_3$. In addition, when necessary, $SnO_2$, chlorine, $Fe_2O_3$, and the like may be added.

The glass material is melted at 1,550 to 1,750° C. for 4 to 20 hours, and the molten glass material is molded, whereby $Li_2O$—$Al_2O_3$—$SiO_2$ crystallizable glass is obtained. In order to adjust the content of β-OH from 0.15 to 2/mm in the crystallizable glass, for example, a raw material containing a large amount of water, such as aluminum hydroxide, may be selected, water content in. combustion gases used for melting glass may be in, creased, or water vapor may be bubbled in molten glass.

The molded material composed of the crystallizable glass is then held at 700 to 800° C. for 1 to 4 hours so as to form nuclei. Subsequently, in order to obtain transparent crystallized glass, the molded material is heated at 800 to 950° C. for 0.5 to 3 hours so as to produce a β-quartz solid solution.

In order to obtain white opaque crystallized glass, the molded material is heated at 1,050 to 1,250° C. for 0.5 to 2 hours so as to produce a β-spodumene solid solution. The crystallized glass thus obtained has the content of β-OH of 0.3 to 4/mm.

After the crystallized glass thus obtained is processed by, for example, cutting, polishing, bending, painting thereon, and the like, the crystallized glass is applied to various applications.

EXAMPLE

Now, the $Li_2O$—$Al_2O_3$—$SiO_2$ crystallized glass of the present invention will be described with reference to the examples.

Tables 1 and 2 show compositions of the examples (Samples #1 to 10) and comparative examples (Samples #11 and 12). In this connection, the Sample #11 is a composition of a conventional crystallized glass.

Individual samples were prepared by the steps described below.

Raw materials in the forms of oxides, hydroxides, halogenated compounds, carbonates, nitrate, and the like were measured so as to form glass having compositions in accordance with those listed in the tables. Each glass composition thus prepared was mixed to be homogeneous and was melted in an electric furnace using a platinum crucible at 1,550 to 1,650° C. for 8 to 20 hours. Concerning the Samples #1 to 10, in order to add water to the glass, aluminum hydroxide was used as a raw material for $Al_2O_3$, and in addition, water vapor was bubbled at the beginning in melting. Subsequently, the molten glass was cast on a surface plate made of carbon and was formed into 5 mm-thick glass sheets by using a roller made of stainless steel. The 5 mm-thick glass sheets were then cooled to room temperature by using a slow cooling furnace. Furthermore, the glass sheets thus formed were crystallized in an electric furnace by heating in accordance with two schedules described below, and the glass sheets were then cooled in the furnace.

Schedule (1) Nucleation: 780° C. for 2 hours, and crystal growth: 900° C. for 3 hours Schedule (2) Nucleation: 780° C. for 2 hours, and crystal growth: 1,160° C. for 1 hour In the schedules described above, rates of increasing temperature were set to be 300° C./hour from room temperature to the temperature for nucleation and to be 100 to 200° C./hour from the temperature for nucleation to the temperature for crystal growth.

TABLE 1

| | Examples | | | | | |
|---|---|---|---|---|---|---|
| | 1 | 2 | 3 | 4 | 5 | 6 |
| $SiO_2$ | 63.6 | 64.5 | 67.7 | 67.1 | 68.0 | 66.5 |
| $Al_2O_3$ | 22.0 | 22.0 | 21.0 | 20.1 | 19.0 | 22.5 |
| $Li_2O$ | 4.4 | 4.5 | 4.1 | 3.9 | 4.2 | 4.0 |
| MgO | — | 0.3 | 0.5 | 0.6 | 0.4 | 0.4 |
| ZnO | 0.4 | 0.5 | 0.2 | — | 0.4 | — |
| BaO | 3.3 | 3.0 | 1.0 | 2.1 | 1.0 | 0.8 |
| $Na_2O$ | 0.5 | 0.3 | — | 0.7 | 0.8 | — |
| $K_2O$ | 0.6 | 0.6 | — | 0.7 | 0.4 | 0.6 |
| $TiO_2$ | 1.7 | 0.5 | 1.4 | 2.3 | 1.2 | 0.6 |
| $ZrO_2$ | 2.1 | 1.8 | 1.6 | 1.2 | 1.6 | 2.0 |
| $P_2O_5$ | 0.9 | 0.9 | 1.0 | — | 1.3 | 1.5 |
| $Sb_2O_3$ | 0.5 | 0.5 | 1.0 | 0.5 | 1.0 | 1.0 |

TABLE 1-continued

| | Examples | | | | | |
|---|---|---|---|---|---|---|
| | 1 | 2 | 3 | 4 | 5 | 6 |
| $As_2O_3$ | — | 0.4 | — | 0.5 | — | — |
| $SnO_2$ | — | — | 0.4 | 0.3 | 0.5 | — |
| Cl | — | 0.2 | 0.1 | — | 0.2 | 0.1 |
| β-OH (/mm) | | | | | | |
| crystallizable glass | 0.30 | 0.28 | 0.35 | 0.40 | 0.40 | 0.44 |
| crystallized glass | 0.55 | 0.50 | 0.62 | 0.75 | 0.71 | 0.80 |

TABLE 2

| | Examples | | | | Comparative Examples | |
|---|---|---|---|---|---|---|
| | 7 | 8 | 9 | 10 | 11 | 12 |
| $SiO_2$ | 66.8 | 67.7 | 69.3 | 68.9 | 65.8 | 65.8 |
| $Al_2O_3$ | 19.0 | 19.0 | 18.0 | 17.0 | 22.1 | 221 |
| $Li_2O$ | 3.5 | 4.8 | 4.2 | 5.0 | 4.2 | 4.2 |
| MgO | — | 0.6 | 0.2 | 0.3 | 0.5 | 0.5 |
| ZnO | — | 0.2 | 0.3 | 0.4 | — | — |
| BaO | 3.2 | 0.5 | 1.7 | 2.4 | — | — |
| $Na_2O$ | 0.4 | 0.5 | 0.8 | 0.6 | 0.5 | 0.5 |
| $K_2O$ | 0.3 | 0.5 | — | 0.2 | 0.3 | 0.3 |
| $TiO_2$ | 2.2 | 1.3 | 1.1 | 1.3 | 1.9 | 1.9 |
| $ZrO_2$ | 2.0 | 2.0 | 2.4 | 2.3 | 2.3 | 2.3 |
| $P_2O_5$ | 1.3 | 1.7 | 1.2 | 0.6 | 1.4 | 1.4 |
| $Sb_2O_3$ | 1.3 | 1.2 | 0.7 | 1.0 | — | 1.0 |
| $As_2O_3$ | — | — | — | — | 1.0 | — |
| $SnO_2$ | — | — | — | — | — | — |
| Cl | — | — | 0.1 | — | — | — |
| β-OH (/mm) | | | | | | |
| crystallizable glass | 0.34 | 0.28 | 0.33 | 0.38 | 0.10 | 0.10 |
| crystallized glass | 0.57 | 0.51 | 0.54 | 0.54 | 0.18 | 0.18 |

Main crystals, appearances, coefficients of thermal expansion, crystallinity, coloration due to impurities, and clarity were measured for the samples thus obtained. The results are shown in Tables 3 and 4. In this connection, "β-Q" and "β-S" in the tables stand for a β-quartz solid solution and a β-spodumene solid solution, respectively.

As can be seen in the Tables, the samples obtained by the schedule (1) had β-quartz solid solution produced as a main crystal, were colorless and transparent in appearance, and had coefficients of thermal expansion of −4 to $1×10^{−7}$/° C. from 30 to 750° C. The samples obtained by the schedule (2) had β-spodumene solid solution produced as a main crystal, were white and opaque in appearance, and had coefficients of thermal expansion of 8 to $17×10^{−7}$/° C. from 30 to 750° C. In addition, both samples formed by the schedules (1) and (2) had superior crystallinity, no coloration due to impurities, and clarity equivalent to that of the conventional product (Sample #11). In contrast, when $As_2O_3$ was simply replaced with $Sb_2O_3$ as shown in the comparative sample #12, clarity and crystallinity were not satisfactory, and coloration due to impurities was also observed.

The main crystal was measured by using an x-ray diffraction apparatus. In order to measure the coefficient of thermal expansion, a simple rod 50 mm long and 5 mm in diameter was formed from the sample of crystallized glass, and an average coefficient of thermal expansion from 30 to 750° C. was measured by using the simple rod. Crystallinity was measured by the existence of defects, such as cracks and surface separation after crystallization. No defect is indicated by a symbol of "○", and the existence of defect is indicated by a symbol of "×". Concerning coloration due to impurities, the samples of crystallized glass were compared with the conventional crystallized glass (Sample #11). Samples having no change in color are indicated by "○",

TABLE 3

|  | Examples | | | | | |
| --- | --- | --- | --- | --- | --- | --- |
|  | 1 | 2 | 3 | 4 | 5 | 6 |
| Schedule (1) | | | | | | |
| Main crystal | β-Q | β-Q | β-Q | β-Q | β-Q | β-Q |
| Appearance | colorless & transparent | colorless & transparent | colorless & transparent | colorless & transparent | colorless & transparent | colorless & transparent |
| Coefficient of Thermal Expansion ($\times 10^{-7}$/° C.) | 1 | 1 | −1 | −1 | −2 | −3 |
| Crystallinity | ○ | ○ | ○ | ○ | ○ | ○ |
| Coloration due to Impurities | ○ | ○ | ○ | ○ | ○ | ○ |
| Schedule (2) | | | | | | |
| Main crystal | β-S | β-S | β-S | β-S | β-S | β-S |
| Appearance | white & opaque | white & opaque | white & opaque | white & opaque | white & opaque | white & opaque |
| Coefficient of Thermal Expansion ($\times 10^{-7}$/° C.) | 17 | 14 | 12 | 14 | 11 | 9 |
| Crystallinity | ○ | ○ | ○ | ○ | ○ | ○ |
| Coloration due to Impurities | ○ | ○ | ○ | ○ | ○ | ○ |
| Clarity (pieces/100 g) | 4 | 3 | 3 | 1 | 2 | 3 |

TABLE 4

|  | Examples | | | | Comparative Examples | |
| --- | --- | --- | --- | --- | --- | --- |
|  | 7 | 8 | 9 | 10 | 11 | 12 |
| Schedule (1) | | | | | | |
| Main crystal | β-Q | β-Q | β-Q | β-Q | β-Q | β-Q |
| Appearance | colorless & transparent | colorless & transparent | colorless & transparent | colorless & transparent | colorless & transparent | colorless & transparent |
| Coefficient of Thermal Expansion ($\times 10^{-7}$/° C.) | 0 | −4 | −4 | −2 | −3 | −4 |
| Crystallinity | ○ | ○ | ○ | ○ | ○ | X |
| Coloration due to Impurities | ○ | ○ | ○ | ○ | ○ | X |
| Schedule (2) | | | | | | |
| Main crystal | β-S | β-S | β-S | β-S | β-S | β-S |
| Appearance | white & opaque | white & opaque | white & opaque | white & opaque | white & opaque | white & opaque |
| Coefficient of Thermal Expansion ($\times 10^{-7}$/° C.) | 14 | 9 | 8 | 8 | 11 | 10 |
| Crystallinity | ○ | ○ | ○ | ○ | ○ | X |
| Coloration due to Impurities | ○ | ○ | ○ | ○ | ○ | X |
| Clarity (pieces/100 g) | 1 | 1 | 3 | 3 | 1 | 12 | and samples having deep colors are indicated by "x". Concerning clarity, glass materials were melted at 1,550 to 1,650° C. for 4 to 8 hours, and samples were formed from the molten glass thus obtained by roll forming. The number of bubbles in the sample thus formed was counted, and the number of bubbles per 100 g was then calculated.

As has thus been described, even when the content of $As_2O_3$ is decreased, the $Li_2O$—$Al_2O_3$—$SiO_2$ crystallized glass of the present invention has the clarity and glass characteristics equivalent to car superior to those of the conventional crystallized glass. Accordingly, the $Li_2O$—$Al_2O_3$—$SiO_2$ crystallized glass of the present invention is a suitable material; for use in front glass panels in kerosene heaters, wood stoves, and the like; substrates for high-technology products such as color filters and image sensors; setters for baking electronic devices; shelf boards for microwave ovens; top plates for electromagnetic cooking devices; window glass for fire doors; and the like.

In addition, the $Li_2O$—$Al_2O_3$—$SiO_2$ crystallized glass described above can be easily produced by using the $Li_2O$—$Al_2O_3$—$SiO_2$ crystallizable glass of the present invention.

What is claimed is:

1. A $Li_2O$—$Al_2O_3$—$SiO_2$ crystallized glass containing, by weight, 0.05 to 4% $Sb_2O_3$, wherein the content of β-OH is 0.3 to 4/mm.

2. A $Li_2O$—$Al_2O_3$—$SiO_2$ crystallized glass according to claim 1, wherein the $Li_2O$—$Al_2O_3$—$SiO_2$ crystallized glass consists essentially of, by weight, 50 to 80% $SiO_2$, 12 to 30% $Al_2O_3$, 1 to 6% $Li_2O$, 0 to 5% MgO, 5 to 5 of Zno, 0 to 8% BaO, 0 to 5% $Na_2O$, 0 to 5% $K_2O$, 0 to 8% $TiO_2$, 0 to 7% $ZrO_2$, 0 to 7% $P_2O_5$, and 0.05 to 4% $Sb_2O_3$.

3. A $Li_2O$—$Al_2O_3$—$SiO_2$ crystallizable glass containing, by weight, 0.05 to 4% $Sb_2O_3$, wherein the content of β-OH is 0.15 to 2/mm.

4. A $Li_2O$—$Al_2O_3$—$SiO_2$ crystallizable glass according to claim 3, wherein the $Li_2O$—$Al_2O_3$—$SiO_2$ crystallizable glass consists essentially of, by weight, 50 to 80% $SiO_2$, 12 to 30% $Al_2O_3$, 1 to 6% $Li_2O$, 0 to 5% MgO, 0 to 5% ZnO, 0 to 8% BaO, 0 to 5% $Na_2O$, 0 to 5% $K_2O$, 0 to 8% $TiO_2$, 0 to 7% $ZrO_2$, 0 to 7% $P_2O_5$, and 0.05 to 4% $Sb_2O_3$.

* * * * *